United States Patent
Mellqvist et al.

(10) Patent No.: US 9,615,243 B2
(45) Date of Patent: Apr. 4, 2017

(54) SYSTEM, METHOD AND COMPUTER PROGRAM PRODUCT FOR CONFIGURING A COMMUNICATION APPLICATION FOR A MOBILE DEVICE

(71) Applicant: Sony Corporation, Tokyo (JP)

(72) Inventors: Anders Mellqvist, Lund (SE); Heino Wendelrup, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 88 days.

(21) Appl. No.: 14/428,497

(22) PCT Filed: Mar. 31, 2014

(86) PCT No.: PCT/IB2014/060315
§ 371 (c)(1),
(2) Date: Mar. 16, 2015

(87) PCT Pub. No.: WO2015/150860
PCT Pub. Date: Oct. 8, 2015

(65) Prior Publication Data
US 2016/0262007 A1    Sep. 8, 2016

(51) Int. Cl.
*H04M 3/00* (2006.01)
*H04W 8/18* (2009.01)
(Continued)

(52) U.S. Cl.
CPC ......... *H04W 8/183* (2013.01); *H04L 63/0853* (2013.01); *H04W 8/205* (2013.01); *H04W 76/02* (2013.01)

(58) Field of Classification Search
CPC ...... H04W 8/183; H04W 8/205; H04W 76/02
(Continued)

(56) References Cited

U.S. PATENT DOCUMENTS

| 8,200,736 B2* | 6/2012 | Shi ..................... H04W 8/205 709/200 |
| 8,700,092 B2* | 4/2014 | De Petris .................. 455/41.2 |

(Continued)

FOREIGN PATENT DOCUMENTS

| EP | 2680628 A1 | 1/2014 |
| WO | 2012058099 A1 | 5/2012 |

(Continued)

OTHER PUBLICATIONS

Park, Jaemin et al., "Secure Profile Provisioning Architecture for Embedded UICC", 2013 International Conference on Availability, Reliability and Security, IEEE, Sep. 2, 2013, pp. 297-303, XP032524210, DOI: 10.1109/ARES.2013.40 [retrieved on Nov. 6, 2013].

(Continued)

*Primary Examiner* — Marceau Milord
(74) *Attorney, Agent, or Firm* — James C. Edwards; Moore & Van Allen PLLC

(57) ABSTRACT

The invention is directed to configuring a mobile device. An exemplary method comprises: connecting, using the mobile device, to a first network; requesting, using the mobile device, a list of subscription options from the first network, wherein the list of subscription options comprises a subscription option associated with a second network different from the first network; selecting, using the mobile device, the subscription option associated with the second network; downloading, using the mobile device, a communication application associated with the selected subscription option; terminating, using the mobile device, the connection to the first network; and connecting, using the mobile device, to the second network using the communication application.

11 Claims, 2 Drawing Sheets

(51) Int. Cl.
*H04L 29/06* (2006.01)
*H04W 8/20* (2009.01)
*H04W 76/02* (2009.01)

(58) Field of Classification Search
USPC .............................. 455/418, 411, 414.1, 558
See application file for complete search history.

(56) References Cited

U.S. PATENT DOCUMENTS

| | | | |
|---|---|---|---|
| 8,903,390 B2 * | 12/2014 | Yoon | H04W 36/385 |
| | | | 455/435.1 |
| 9,100,810 B2 * | 8/2015 | Schell | H04W 8/205 |
| | | | 455/411 |
| 9,235,406 B2 * | 1/2016 | Sen | G06F 8/67 |
| 9,253,630 B2 * | 2/2016 | Tagg | H04W 4/003 |
| 2014/0031012 A1 | 1/2014 | Park et al. | |
| 2014/0045460 A1 | 2/2014 | Park et al. | |

FOREIGN PATENT DOCUMENTS

| | | | |
|---|---|---|---|
| WO | 2013027085 A1 | 2/2013 | |
| WO | 2013039900 A1 | 3/2013 | |

OTHER PUBLICATIONS

International Search Report and Written Opinion; Jan. 16, 2015; issued in International Patent Application No. PCT/IB2014/060315.

\* cited by examiner

SYSTEM, METHOD AND COMPUTER PROGRAM PRODUCT FOR CONFIGURING A COMMUNICATION APPLICATION FOR A MOBILE DEVICE

BACKGROUND ART

The Universal Integrated Circuit Card ("UICC") is a smart card used in mobile devices in Global System for Mobile Communications ("GSM") and Universal Mobile Telecommunications System ("UMTS") networks. In a GSM network, the UICC comprises a Subscriber Identity Module ("SIM") application, and in a UMTS network, the UICC comprises a Universal Subscriber Identity Module ("USIM") application. In some embodiments, the UICC comprises more than one application (e.g., a communication application), thereby enabling a mobile device comprising a UICC to access both GSM and UMTS networks. Additionally, the UICC provides for storage of a phone book (e.g., contact information such as phone numbers, email addresses, etc.). The UICC also enables access to a GSM network via a USIM application and enables access to a UMTS network using a SIM application. In some embodiments, the UICC also comprises an Internet Protocol Multimedia Services Identity Module ("ISIM") that is required for services in the Internet Protocol Multimedia Subsystem ("IMS"). The current environment with removable UICCs in devices does not scale to a situation where there will be billions of connected devices. It is not possible to put physical UICCs in all these devices or individually configure electronic UICCs for these devices. Therefore, what is needed is an alternative to removable UICCs in devices such as mobile phones and embedded, but preconfigured UICCs in machine-to-machine ("M2M") devices.

SUMMARY

Embodiments of the invention are directed to a system, method, and computer program product for configuring a mobile device. An exemplary method comprises: connecting, using the mobile device, to a first network; requesting, using the mobile device, a list of subscription options from the first network, wherein the list of subscription options comprises a subscription option associated with a second network different from the first network; selecting, using the mobile device, the subscription option associated with the second network; downloading, using the mobile device, a communication application associated with the selected subscription option; terminating, using the mobile device, the connection to the first network; and connecting, using the mobile device, to the second network using the communication application.

In some embodiments, the method further comprises scanning for available networks.

In some embodiments, the mobile device comprises a Universal Integrated Circuit Card ("UICC").

In some embodiments, the first network is associated with a first mobile network operator ("MNO"), and wherein the second network is associated with a second MNO.

In some embodiments, the first network advertises a bootstrap communication application.

In some embodiments, the communication application comprises a Subscriber Identity Module ("SIM") application.

In some embodiments, the first network comprises a wireless local area network.

In some embodiments, the mobile device comprises a mobile phone.

In some embodiments, the mobile device enables a user to modify a setting of the application either before or after terminating the connection to the first network.

In some embodiments, the communication application is associated with at least one of a primary communication subscription, a secondary communication subscription, or a foreign communication subscription.

In some embodiments, at the time of connecting to the first network, the mobile device does not have a preexisting communication subscription to the first network, an MNO associated with the first network, the second network, or an MNO associated with the second network.

In some embodiments, a mobile device is provided for connecting to a network. The mobile device comprises: a memory; a processor; a module stored in the memory, executable by the processor, and configured to: connect, using the mobile device, to a first network; request, using the mobile device, a list of subscription options from the first network, wherein the list of subscription options comprises a subscription option associated with a second network different from the first network; select, using the mobile device, the subscription option associated with the second network; download, using the mobile device, a communication application associated with the selected subscription option; terminate, using the mobile device, the connection to the first network; and connect, using the mobile device, to the second network using the communication application.

In some embodiments, a computer program product for configuring a mobile device is provided. The computer program product comprises a non-transitory computer-readable medium comprising code configured to: connect, using the mobile device, to a first network; request, using the mobile device, a list of subscription options from the first network, wherein the list of subscription options comprises a subscription option associated with a second network different from the first network; select, using the mobile device, the subscription option associated with the second network; download, using the mobile device, a communication application associated with the selected subscription option; terminate, using the mobile device, the connection to the first network; and connect, using the mobile device, to the second network using the communication application.

BRIEF DESCRIPTION OF DRAWINGS

Figure 1:
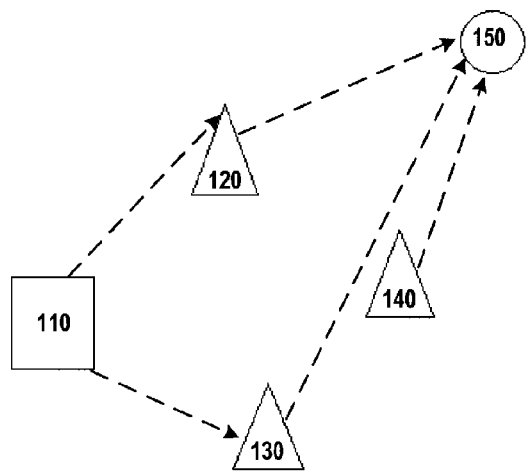
Figure 2:
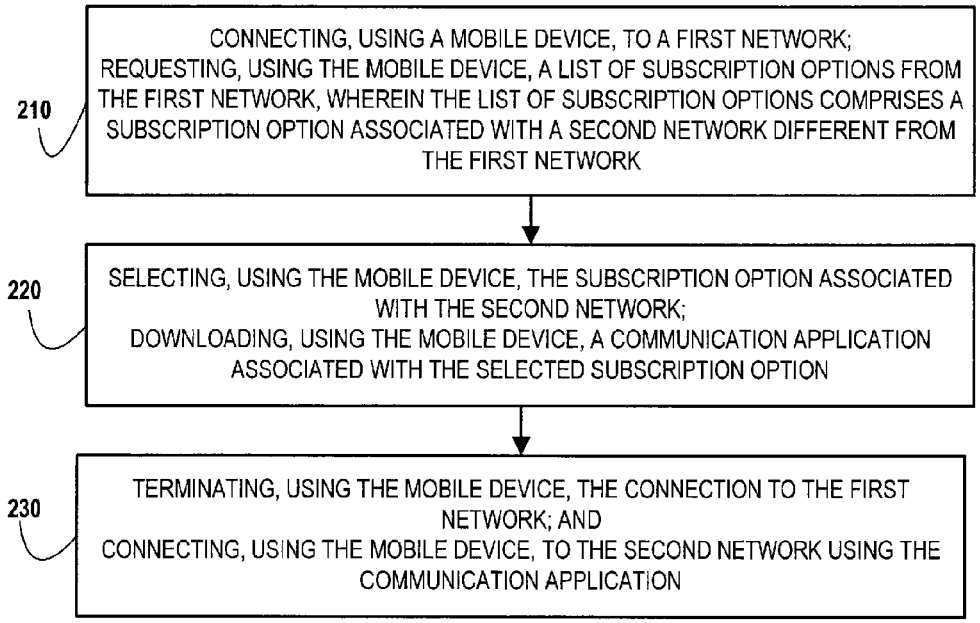
Figure 3:
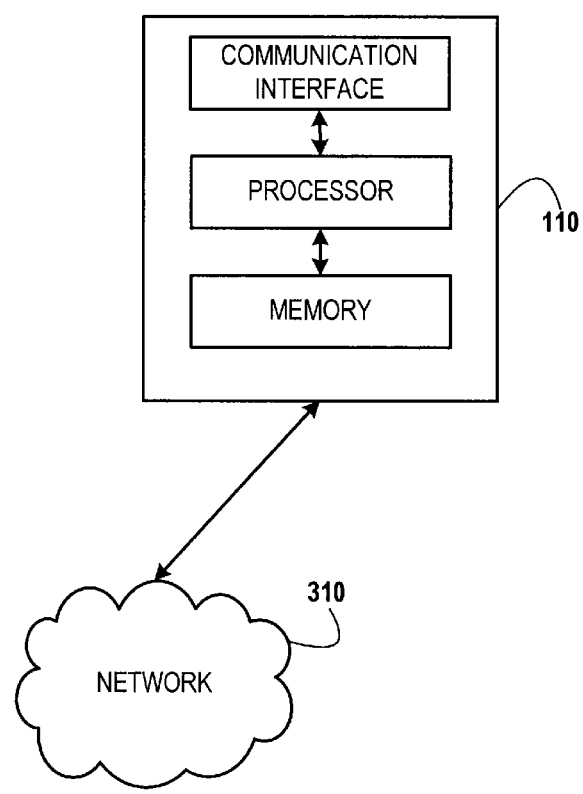

Having thus described embodiments of the invention in general terms, reference will now be made to the accompanying drawings, where:

FIG. 1 presents an exemplary block diagram for configuring a mobile device, in accordance with embodiments of the present invention;

FIG. 2 presents an exemplary process flow for configuring a mobile device, in accordance with embodiments of the present invention; and FIG. 3 presents an exemplary network environment for configuring a mobile device, in accordance with embodiments of the present invention.

DESCRIPTION OF EMBODIMENTS

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A mobile device may comprise a UICC as described herein. When a mobile device is booted up for the first time after purchasing the mobile device or after a mobile device reset, the mobile device, using a bootstrap SIM mechanism, makes a first connection to a network and downloads a list of subscription alternatives or options from the network. The network is associated with a mobile network operator or a wireless services provider. If the only available network at the time making the first connection to the network is a particular network, a dependency on the MNO associated with that particular network may be created. Therefore, the mobile device has to rely on that particular MNO for support. Therefore, there is a need to enable a mobile device to connect to a network associated with a particular mobile network operator and enable the mobile device to choose among subscription options offered by both the particular MNO and other MNOs not affiliated with the particular MNO. As used herein, the network may comprise a mobile radio network. In some embodiments, the network comprises a wireless local area network ("WLAN"), however, the invention is equally applicable to any other wireless area network (e.g., wireless rural area network, wireless wide-area network, etc.). If the initial connection is made using a Wireless Fidelity ("WiFi") network, there is no need for a communication application as described herein.

The present invention is directed to enabling a mobile device with a UICC to connect to any network in order to configure the mobile device with a bootstrap SIM mechanism. The bootstrap mechanism is preconfigured in the mobile device, and enables the mobile device to download the communication application described herein. The present invention requires modifications to standards associated with present mobile network standards such as the 3rd Generation Partnership Project ("3GPP") standard, the European Telecommunications Standards Institute ("ETSI") standard, etc. Therefore, the present invention enables an over the air ("OTA") configuration of a communication application for a mobile device.

The present invention enables a device (e.g., a mobile device) with a UICC to establish a connection to any available network. The UICC may be embedded at the time of purchase of the device, or may be inserted into the mobile device at a later point in time. While the device is preconfigured with a bootstrap mechanism, the device does not comprise a communication application until it is downloaded from an external source. The UICC is an example of hardware capable of running a communication application, but the communication application may also be run in other types of hardware such as an embedded secure element, a trusted execution environment, a general purpose application processor, etc. The connection to the network enables the device to download a list of available MNOs and subscription alternatives or options associated with each MNO. Therefore, a user of the device may select a particular subscription option associated with a particular MNO. The device can then download an application (e.g., a SIM application or other communication application) associated with the particular subscription option. Once the application is downloaded, the connection to the network is closed, and new connection is established based on the downloaded application. The new connection is a connection to a network associated with the selected subscription option which is associated with a particular MNO. If the application enables the user to personalize the application, the user may select one or more personalization (or modification) options associated with the application. The personalization or modification may be executed either before or after the original connection to the network is closed, and either before or after a new connection to a new network is established using the downloaded application.

The present invention may be used when a device wants to establish an initial communication subscription after purchase or after a device reset (e.g., where information associated with previous communication subscriptions has been lost), after a communication subscription has ended, when a user wants to switch primary communication subscriptions (e.g., from a first MNO to a second MNO), add secondary communication subscriptions (e.g., add a communication subscription to a second MNO while retaining a communication subscription to a first MNO), or add additional subscriptions for particular uses that may be associated with a particular period of time (e.g., a foreign communication subscription (comprising a start date and an end date) for using the mobile device for communication purposes outside the country associated with any existing communication subscription). As used herein, a communication subscription enables a mobile device to make or receive a phone call, send or receive a text or multimedia message, use mobile applications, browse the Internet, etc.

Referring now to FIG. 1, FIG. 1 describes an exemplary block diagram for configuring a mobile device. When mobile device 110 needs to be configured, the mobile device 110 scans for a network and connects randomly to a network that advertises a bootstrap function. For example, mobile device 110 connects to network 120. Each of the networks 120, 130, and 140 has access to a database 150 of available subscription options associated with multiple networks or multiple MNOs. Therefore, the mobile device 110 requests a list of subscription options from the network 120. A user of the mobile device 110 chooses one of the subscription options presented on the display of the mobile device 110. For example, the selected option is an MNO associated with network 130 and a particular type of communication subscription (e.g., associated with a particular price, duration, etc.). The network downloads a communication application (e.g., a SIM application) associated with the selected option from the database 150 and transmits it to the mobile device 110. The mobile device 110 subsequently disconnects its connection to the network 120, and connects to the network 130 using the application that was previously transmitted to or downloaded to the mobile device 110. The communication application can be used to configure an embedded communication card or module (e.g., a SIM card, a UICC card, etc.) located in the mobile device 110.

Referring now to FIG. 2, FIG. 2 illustrates an exemplary process flow for configuring a mobile device (e.g., a mobile phone) comprising a UICC, in accordance with embodiments, of the invention. At step 210, the process flow comprises connecting, using the mobile device, to a first network (e.g., a WLAN) that advertises a bootstrap communication application (e.g., after scanning for available networks that advertise bootstrap communication applications), and requesting, using the mobile device, a list of subscription options from the first network, wherein the list of subscription options comprises a subscription option associated with a second network. In some embodiments, the second network is different from the first network. In other embodiments, the second network is the same as the first network. At step 220, the process flow comprises selecting, using the mobile device, the subscription option associated with the second network, and downloading, using the mobile device, a communication application (e.g., a SIM application, a UICC application, etc.) associated with the selected subscription option. At step 230, the process flow comprises terminating, using the mobile device, the connection to the first network, and connecting, using the mobile device, to the second network using the communication application.

The first network is associated with a first MNO, and the second network is associated with a second MNO different from the first MNO. In some embodiments, the mobile device enables a user to modify a setting of the communication application either before or after terminating the connection to the first network, and either before or after connecting to the second network. In some embodiments, the communication application is associated with at least one of a primary communication subscription, a secondary communication subscription, or a foreign communication subscription. At the time of connecting to the first network, the mobile device does not have a preexisting communication subscription to the first network, an MNO associated with the first network, the second network, or an MNO associated with the second network.

The invention is not limited to any particular types of mobile devices. As used herein, a mobile device may also be referred to as a device, a system, or apparatus. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable or non-portable computing or non-computing devices. In some embodiments, the mobile device may not be portable (e.g., a water meter reader, a smart grid device, etc.).

Referring now to FIG. 3, FIG. 3 presents an exemplary block diagram of the network environment for configuring a mobile device, in accordance with embodiments of the present invention. As illustrated, the network environment includes a network 310 and a mobile device 110. As shown in FIG. 3, the mobile device 110 is operatively and selectively connected (e.g., via one or more wired or wireless mechanisms) to the network 310, which may include one or more separate networks.

The mobile device 110 is a computing device that comprises a communication interface, a processor, a memory, and a module stored in the memory, executable by the processor, and configured to perform the various processes described herein. Each communication interface described herein enables communication with other systems via the network 310.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A method for configuring a mobile device, the method comprising:
   scanning, using the mobile networks, for available networks that advertise a plurality of communication applications, each application associated with at least one subscription option;
   connecting, using the mobile device, to a first network, wherein the first network is one of the available networks;
   requesting, using the mobile device, a list of the subscription options from the first network, wherein the list of subscription options comprises a subscription option associated with a second network different from the first network;
   selecting from the list of subscription options, using the mobile device, the subscription option associated with the second network;
   in response to selecting, downloading, using the mobile device, a communication application associated with the selected subscription option;
   in response to downloading the communication application, terminating, using the mobile device, the connection to the first network; and
   connecting, using the mobile device, to the second network using the communication application.

2. The method of claim 1, wherein the mobile device comprises a Universal Integrated Circuit Card (UICC).

3. The method of claim 1, wherein the first network is associated with a first mobile network operator (MNO), and wherein the second network is associated with a second MNO.

4. The method of claim 1, wherein the communication application comprises a Subscriber Identity Module (SIM) application.

5. The method of claim 1, wherein the first network comprises a wireless local area network.

6. The method of claim 1, wherein the mobile device comprises a mobile phone.

7. The method of claim 1, wherein the mobile device enables a user to modify a setting of the communication application either before or after terminating the connection to the first network.

8. The method of claim 1, wherein the communication application is associated with at least one of a primary communication subscription, a secondary communication subscription, or a foreign communication subscription.

9. The method of claim 1, wherein, at the time of connecting to the first network, the mobile device does not have a preexisting communication subscription to the first network, an MNO associated with the first network, the second network, or an MNO associated with the second network.

10. A mobile device for connecting to a network, the mobile device comprising:
   a memory;
   a processor;
   a module stored in the memory, executable by the processor, and configured to:
      scan for available networks that advertise a plurality of communication applications, each application associated with at least one subscription option;
      connect, using the mobile device, to a first network, wherein the first network is one of the available networks;
      request, using the mobile device, a list of the subscription options from the first network, wherein the list of subscription options comprises a subscription option associated with a second network different from the first network;
      select from the list of subscription options, using the mobile device, the subscription option associated with the second network;
      in response to selecting, download, using the mobile device, a communication application associated with the selected subscription option;
      in response to downloading the communication application, terminate, using the mobile device, the connection to the first network; and
      connect, using the mobile device, to the second network using the communication application.

11. A computer program product for configuring a mobile device, the computer program product comprising a non-transitory computer-readable medium comprising code configured to:
   scan, using the mobile device, for available networks that advertise a plurality of communication applications, each application associated with at least one subscription option;
   connect, using the mobile device, to a first network, wherein the first network is one of the available networks;
   request, using the mobile device, a list of the subscription options from the first network, wherein the list of subscription options comprises a subscription option associated with a second network different from the first network;
   select from the list of the subscription options, using the mobile device, the subscription option associated with the second network;
   in response to selecting, download, using the mobile device, a communication application associated with the selected subscription option;
   in response to downloading, terminate, using the mobile device, the connection to the first network; and
   connect, using the mobile device, to the second network using the communication application.

* * * * *